J. REICHERT.
HORSE BLANKET FASTENING.
APPLICATION FILED FEB. 11, 1907. RENEWED MAR. 5, 1908.
No. 898,924.
Patented Sept. 15, 1908.
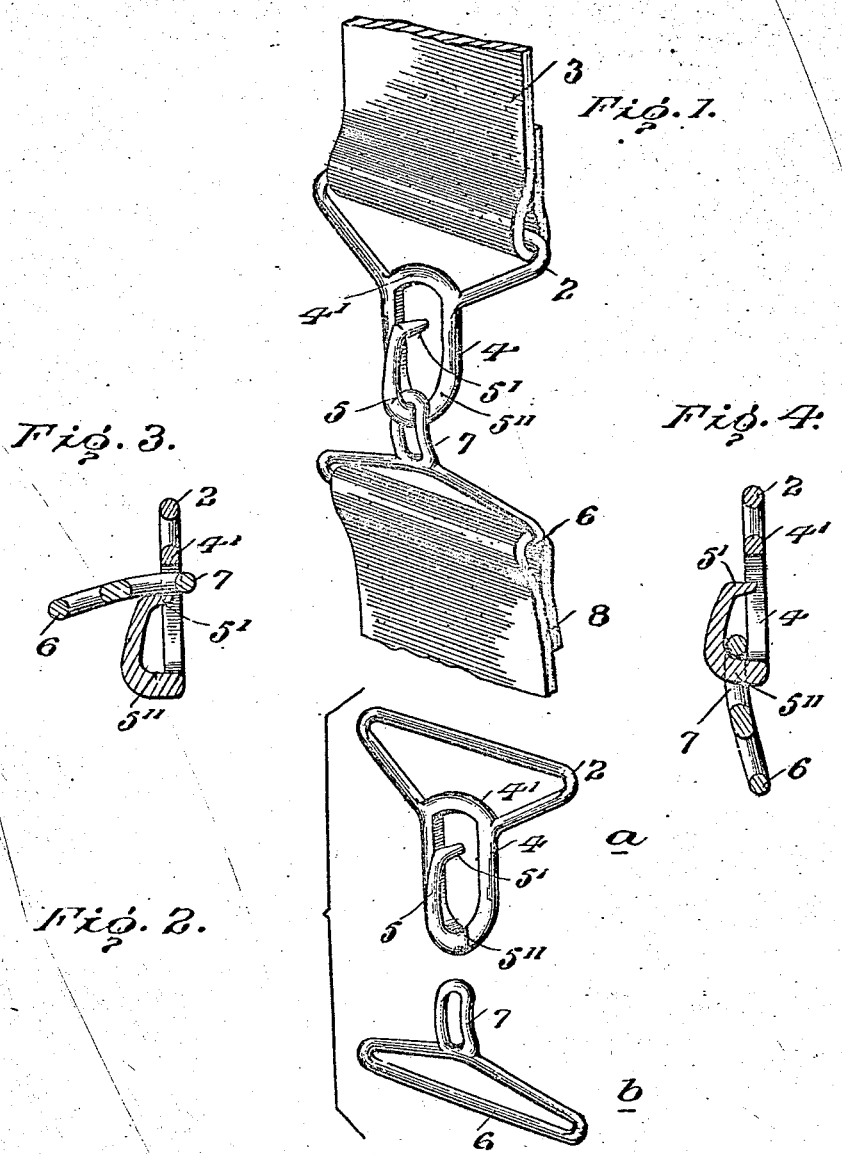
Witnesses
E. R. Peck
C. P. Wright Jr.
Inventor
John Reichert
By Hubert E. Peck
Attorney

UNITED STATES PATENT OFFICE.

JOHN REICHERT, OF RACINE, WISCONSIN.

HORSE-BLANKET FASTENING.

No. 898,924.　　　Specification of Letters Patent.　　Patented Sept. 15, 1908.

Application filed February 11, 1907, Serial No. 356,766.　Renewed March 5, 1908.　Serial No. 419,393.

*To all whom it may concern:*

Be it known that I, JOHN REICHERT, a citizen of the United States, residing at Racine, Racine county, State of Wisconsin, have invented certain new and useful Improvements in Horse - Blanket Fastenings; and I do hereby declare the following to be a full, clear, and exact description of the invention, such as will enable others skilled in the art to which it appertains to make and use the same.

This invention relates to certain improvements in fasteners and more particularly relates to fastening devices for the belts or straps of horse blankets or the like.
An object of the invention is to provide a simple, and durable fastening device which can be produced at a low cost, and which will reduce to the minimum, accidental separation or uncoupling of the parts after being attached or coupled together, and which presents no points or projections likely to catch in or tear adjacent blankets when drawn from a pile of superimposed blankets on the counter or shelves or in the package.
The invention consists in certain novel features in construction and arrangements or combination of parts as more fully and particularly set forth hereinafter.

Referring to the accompanying drawings:—Figure 1, is a perspective view of the fastening applied to the bands or straps of a horse blanket. Fig. 2, is a detached perspective view of the two fastening members, separated. Fig. 3, is a sectional view showing the two members in the act of being coupled or uncoupled. Fig. 4, is a sectional view through the two members coupled together.

The fastening consists of two members, a hook member, *a*, and an eye member *b*.
Each member is formed of one piece of suitable metal, preferably by casting to form the member of the desired strength and rigidity. The member *a*, consists of the top transverse loop 2, having the top straight cross bar around which the strap, band or surcingle 3, of the horse blanket is secured. From the center of the lower cross bar of the loop 2, depends a vertically elongated open frame or loop 4, closed at the top by the upwardly arched cross piece 4', which in effect forms the central portion of the bottom cross bar of the loop 2, thereby closing the central opening of the frame 4 from the opening of the loop 2. The frame or loop 4, is preferably contracted in width toward its lower end. A hook 5, extends outwardly from the lower end of the loop or frame 4, and is extended vertically longitudinally and centrally of the loop 4 and has its free end or hook bill 5', projected inwardly a short distance below the cross bar 4'. The hook bill 5' extends into the upper portion of the opening of the loop 4 to a point inwardly beyond the plane of the outer face of the loop 4. The inwardly extending bill 5' is approximately parallel with the lower outwardly extending portion 5". The vertically extending portion of the hook between the outwardly extending portion 5" and the hook bill 5' is inclined upwardly and inwardly, as more particularly shown by Figs. 3 and 4.

The member *b* consists of the closed transverse loop 6, from the central portion of the upper cross bar of which projects the closed loop or eye 7. This eye 7 is longitudinally elongated and is longitudinally curved upwardly and inwardly. The free end of a band, strap or surcingle 8 secured to the horse blanket, is passed through and secured or confined to the loop 6.

The elongated eye 7 is so formed as to freely pass inwardly between the hook bill 5' and the cross bar 4', when said eye is held approximately at right angles to the longitudinal plane of the member *a*, as indicated by Fig. 3. In this position the eye 7 can be slipped to or from the hook of the member *a*. When the members *a* and *b* are coupled together as shown by Figs. 1 and 4, accidental release of the eye 7 is practically impossible. The eye 7 is elongated and curved to permit the eye to hang from the hook and extend downwardly and inwardly to throw the loop 6 in toward the surface of the blanket so that the band end 8 can lie in practically the same plane as the band end 3. The lower closed end of the eye 7, acts as a stop against upward movement of the eye on the hook when in the coupled position and also prevents wearing engagement between the hook and the band 8 passed through the loop 6. The cross bar 4' serves as a guide for the eye 7 in the operations of coupling and uncoupling the members and also prevents wearing engagement between the eye 7 and the band 3 passed through the loop 2. The eye 7 is also elongated to permit its insertion in the upper end of the frame 4 and its downward passage onto the hook, the length of the opening of the eye 7 being slightly greater than the length of the hook bill 5'.

The fastening members described are preferably rigid, each being formed by an integral casting, and the members are held locked together by reason of their peculiar formation, without depending on spring or elastic action of side bars or other portions of said members. The members are also so formed as not to catch in parts of adjacent blankets where the blankets are piled in stacks, on the counter or the shelf, whereby intermediate blankets of the pile can be pulled out without danger of the fastening catching in and tearing adjacent blankets.

What I claim is:—

1. A fastening consisting of two members having means for attachment to the ends of the band to be coupled together, one member comprising an elongated loop having rigid longitudinal side bars and a hook rising from the closed outer end of the loop and extending longitudinally thereof with its bill extending into the loop adjacent to and spaced from the closed inner end of the loop and at its inner extremity terminating outwardly beyond the plane of the inner side face of the loop, the other member comprising an elongated eye in length shorter than said hook and formed to pass into said loop and receive said hook and having non-elastic walls, substantially as described.

2. A horse blanket fastener consisting of two members, each formed in one piece, one member consisting of a transverse loop to receive a band and having a central depending closed loop frame provided with a rigid hook extending from the lower end of said frame outwardly and upwardly and formed with an inturned bill adjacent to the upper end of said frame, the other member consisting of a transverse closed loop to receive a band and a rigid closed eye projecting from the central portion of one bar of the loop, said eye elongated and curved, substantially as described.

3. A fastening consisting of two members, one member comprising a rigid narrow, longitudinally elongated closed eye provided with means whereby said eye is adapted to be secured to a band end, the other member comprising a longitudinally elongated closed loop provided with means whereby said loop is adapted to be secured to a band end, said loop formed with a hook rising from the lower end thereof and terminating adjacent to the upper end of the loop, said hook being greater in length than said elongated eye and having its bill extending into the upper end portion of the hook opening.

4. A fastening for horse blankets, or the like, consisting of two members, each formed in one piece, one member consisting of a transverse band loop having a central projecting rigid closed eye, and the other member consisting of a transverse band loop having a central projecting rigid longitudinally elongated closed loop frame having a rigid hook rising from its outer end and from thence arranged longitudinally in front of the frame opening and extending toward the inner end thereof and having its bill projecting into the inner end portion of the frame opening, said bill being spaced from the inner end and longitudinal side walls of said frame to permit said eye to move transversely through the upper end of the frame opening, and then longitudinally thereof to pass around the bill and onto the hook.

In testimony whereof I affix my signature, in presence of two witnesses.

JOHN REICHERT.

Witnesses:
HUBERT E. PECK,
E. R. PECK.